United States Patent [19]
Onsrud

[11] Patent Number: 5,205,331
[45] Date of Patent: Apr. 27, 1993

[54] TENSION REDUCER FOR A POWER TOOL DRIVE APPARATUS

[75] Inventor: John Onsrud, Statesville, N.C.

[73] Assignee: C.R. Onsrud, Inc., Troutman, N.C.

[21] Appl. No.: 881,420

[22] Filed: May 11, 1992

[51] Int. Cl.⁵ .............................................. B27C 5/02
[52] U.S. Cl. ............................. 144/134 A; 144/136 R; 144/145 A; 409/97; 409/110; 474/110; 474/114
[58] Field of Search ............. 409/97, 110; 144/134 R, 144/134 A, 134 B, 136 R, 144 R, 145 R, 145 A, 371; 474/110, 113, 114, 133, 136

[56] References Cited
U.S. PATENT DOCUMENTS 4,893,661  1/1990  Onsrud ........................... 144/134 A Primary Examiner—W. Donald Bray
Attorney, Agent, or Firm—W. Thad Adams, III

[57] ABSTRACT

A tension reducer for a tension controller for use on a power tool such as an inverted router. The router has a drive motor, a motor driven pulley, a router bit-carrying spindle moveable between a lowered inoperative position and an raised cutting position, a drive belt for transferring rotational motion from the motor driven pulley to the spindle, and a drive belt tension control apparatus. The drive belt tension control apparatus includes a mount for mounting the motor driven pulley in continuously variable spaced-apart relation to the spindle during operation of the router and a pressure source for exerting a predetermined pressure on the motor driven pulley and thereby a predetermined tension on the drive belt during operation of the router for rotating the spindle. A tension reducer reduces the tension on the spindle during movement of the spindle between its lowered inoperative position and raised cutting positions for preventing tension-induced hesitation in the movement of the spindle.

15 Claims, 3 Drawing Sheets

TENSION REDUCER FOR A POWER TOOL DRIVE APPARATUS

TECHNICAL FIELD AND BACKGROUND OF THE INVENTION

This invention relates to a drive belt tension control apparatus for a powered machine such as a power tool of the type wherein tension on one or more rotating parts is provided by pneumatic pressure through the operation of a pneumatic piston and cylinder assembly. The particular embodiment of a power tool incorporating the principles of the invention and disclosed in this application is an inverted router.

An inverted router is a particular type of woodworking machine wherein the operator is protected from the router bit by positioning the workpiece on a table and making cut in the workpiece from the underside. The table has on opening through which the router bit protrudes. The router bit is mounted on a spindle. A foot-operated pedal controls movement of the router bit upwardly through the table opening into workpiece engagement and downwardly out of workpiece engagement. The router bit moves vertically on a precise axis in order that the cuts be precisely positioned. This axis is defined by a guide pin which is positioned on the same axis and is used to guide the workpiece on the table.

In most types of inverted routers the spindle is driver by a motor through a pulley and belt arrangement. It is important to maintain the tension on this belt within a relatively narrow range. If the belt tension is too high the spindle may be deflected off of the proper rotational axis and the life of the bearings in the spindle assembly substantially shortened. If the tension is too low, slippage between the belt and one or both of the pulleys can reduce the speed of the spindle to below its optimum speed, especially when the spindle is under load while a cut is being made. Reduced spindle speed can also cause the router bit to chatter in the workpiece, stop, and/or cause excessive wear to the belt and pulley.

Prior art belt tensioning devices comprise brackets which are loosened while the tension is adjusted, and then tightened to maintain the tension at that point. However, this method is highly inaccurate and time consuming. Even if the tension is adjusted properly, belt elongation, temperature, humidity and vibration can very quickly cause the tension to move out of proper adjustment. Ideally, tension should be controlled constantly, and should be variable, if necessary, to take into account environmental and operating conditions. Using the motor as a tensioning weight cannot be done since the motor and spindle must be maintained in proper axial alignment with each other.

A workable and efficient solution to this problem was developed by applicant and is disclosed in U.S. Pat. No. 4,893,661. In the '661 Patent, the motor pulley of the router is mounted for continuously variable movement, either on a slide arrangement, or by pivoting the motor pulley on a vertical axis. Then a predetermined pressure is applied to the motor pulley which tensions the drive belt connecting the motor pulley and the spindle carrying the router bit. In the '661 Patent, the pressure is applied by a pneumatic piston and cylinder assembly. Thus, proper tension is maintained at all times. Tension is easily adjusted by varying the air pressure to the piston and cylinder assembly.

This solution provides excellent tension control. However, it has been observed that under certain conditions the tension on the spindle is sufficiently great that when the spindle is moved upwardly into cutting position, a certain amount of hesitation is experienced. This is the result of having to reach a certain level of force to overcome vertically stationary inertia of the spindle and the force with which it is being held in its vertical position by the tension on the drive belt. The invention of this application solves this problem without any detrimental effect on the precise tension control achieved through the use of the tension control apparatus disclosed in the '661 Patent.

SUMMARY OF THE INVENTION

Therefore, it is an object of the invention to provide an apparatus for reducing tension on rotating parts of a power tool during certain power tool operations.

It is another object of the invention to provide an apparatus for reducing tension on the spindle of an inverted router during movement of the spindle into cutting position.

It is another object of the invention to provide a drive belt tension control which constantly maintains proper belt tension on the drive belt and pulleys and which is tension controllable during movement of the router bit into cutting position.

It is another object of the invention to provide a drive belt tension control the tension provided by which is reduced by bleed air from a pneumatic cylinder which raises and lowers the spindle.

It is another object of the invention to provide a drive belt tension control which requires no periodic manual adjustment.

It is another object of the invention to provide a drive belt tension control which maintains proper axial alignment between the spindle and drive motor.

These and other objects of the present invention are achieved in the preferred embodiments disclosed below by providing a inverted router characterized by having a drive motor, a motor driven pulley, a router bit-carrying spindle moveable between a lowered inoperative position and an raised cutting position, a drive belt for transferring rotational motion from the motor driven pulley to the spindle, and a drive belt tension control apparatus. The drive belt tension control apparatus includes mounting means for mounting the motor driven pulley in continuously variable spaced-apart relation to the spindle during operation of the router and pressure means for exerting a predetermined pressure on the motor driven pulley and thereby a predetermined tension on the drive belt during operation of the router for rotating the spindle. The improvement is provided which comprises tension reducing means for reducing the tension on the spindle during movement of the spindle between its lowered inoperative position and raised cutting positions for preventing tension-induced hesitation in the movement of the spindle.

According to one preferred embodiment of the invention, the pressure means comprises a first pneumatic cylinder and piston assembly.

According to another preferred embodiment of the invention, a second pneumatic piston and cylinder means is mounted in axial alignment with the axis of movement of the spindle for moving the spindle; the tension reducing means comprising valve means for bleeding air from the second pneumatic piston and cylinder means during movement of the spindle from its lower to its raised position. Conduit means are provided for conveying the bleed air from the second pneumatic piston and cylinder means to the first pneumatic piston and cylinder means in opposition to the air pressure in the first piston and cylinder means to thereby reduce the air pressure therein and the tension applied by the motor driven pulley through the drive belt to the spindle during spindle movement.

Preferably, the conduit means includes air reservoir means with an opening to atmosphere for reducing air pressure within the conduit.

According to another preferred embodiment of the invention, the conduit means communicates with the rod-side of the first piston and cylinder assembly.

According to yet another preferred embodiment of the invention, the drive motor and the spindle are each vertically positioned in axial alignment with each other, and wherein the of the router.

According to one preferred embodiment of the invention, the mounting means comprise a plate mounted for sliding movement perpendicular to the axis of rotation of the spindle.

According to another preferred embodiment of the invention, the mounting means includes a pair of spaced-apart, opposed slide rails positioned on opposing vertical side walls of the router, and the plate positioned for sliding movement in the slide rails.

Preferably, the pressure means comprises a pneumatic pressure cylinder and piston assembly, with one of the cylinder or the piston mounted on a stationary portion of the router and the other of the cylinder and piston engaging the plate.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
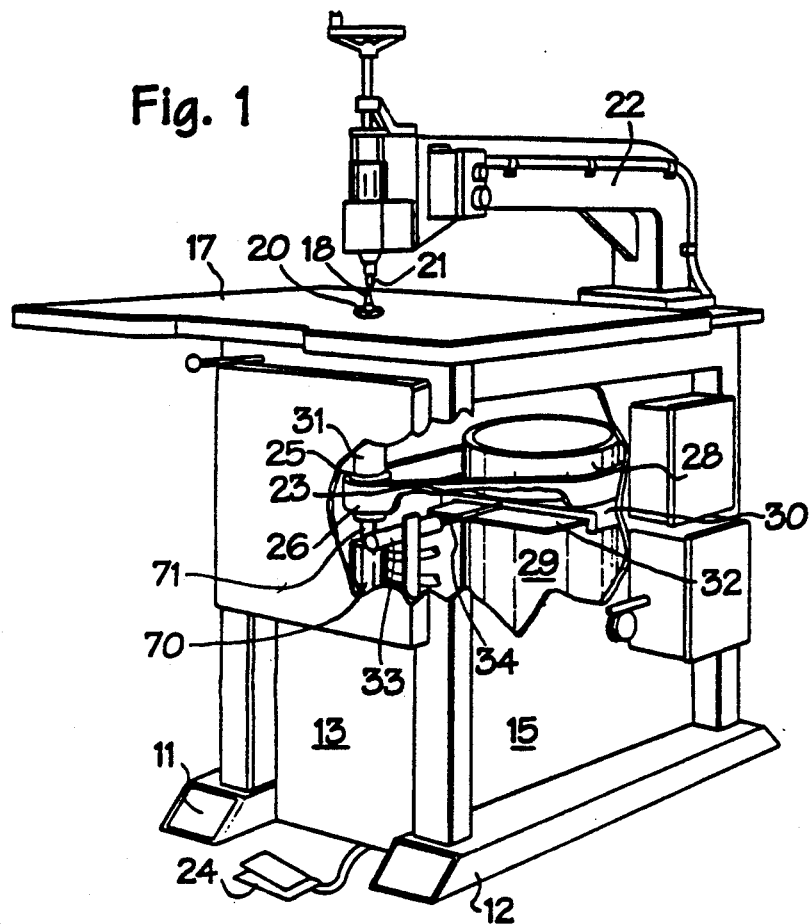
FIG. 1 is a perspective view of an inverted router, with parts broken away, according to one embodiment of the invention.
Figure 2:
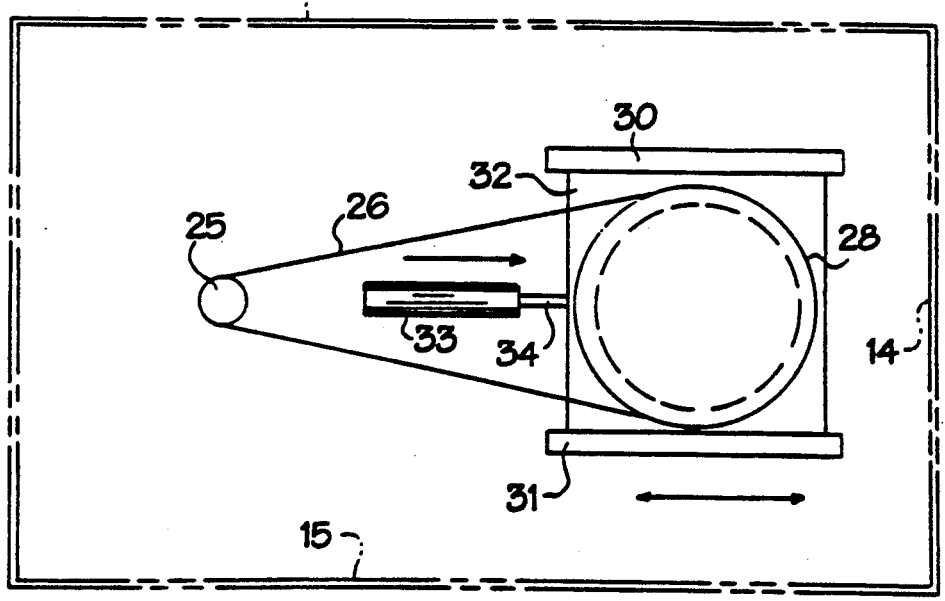
FIG. 2 is a fragmentary top plan view of the major drive components of the inverted router shown in FIG. 1.

Referring now specifically to the drawings, an inverted router according to the present invention is illustrated in FIG. 1 and shown generally at reference numeral 10. Router 10 is constructed on a steel frame which includes a pair of hollow support skids 11 and 12 by which router 10 can be moved by a forklift. As is shown by simultaneous reference to FIGS. 1 and 2, the operating components of router 10 are housed within front and rear vertical wall panels 13 and 14, and side panels 15 and 16. A workpiece (not shown) is supported on a table 17 as it is moved over a router bit 18 which extends upwardly through an opening 20 in table 17. A guide pin 21 positioned on the end of a guide arm 22 is used to guide a template and thereby the workpiece.

Router bit 18 is mounted on the upper end of a spindle 23 by means of a chuck (not shown). Spindle 23 and therefore the router bit 18 is moved up and down by a foot pedal 24. A spindle pulley 25 mounted on the lower end of spindle 23 carries a woven drive belt 26. Drive belt 26 also passes around a motor pulley 28 mounted for rotation on a drive motor 29. As is shown in FIG. 1, motor pulley 28 is much wider than belt 26. As spindle 23 is raised and lowered, belt 26 rides up and down motor pulley 28 so that it remains trained in driving relation to the vertically moving spindle 23.

Proper tension is maintained on belt 26 by means of a pair of slide rails 30 and 31 mounted on side walls 16 and 15, respectively. Preferably, these slide rails 30 and 31 are mounted in vibration absorbing rubber mounts (not shown). Motor 29 is mounted on a steel plate 32, the opposing edges of which are mounted for sliding movement in slide rails 30 and 31. A pneumatic cylinder 33 is mounted in a fixed position in front of and in vertical alignment with the front edge of plate 32. A piston rod 34 is responsive to pneumatic pressure to urge plate 32 in a direction away from spindle pulley 25.

Figure 5:
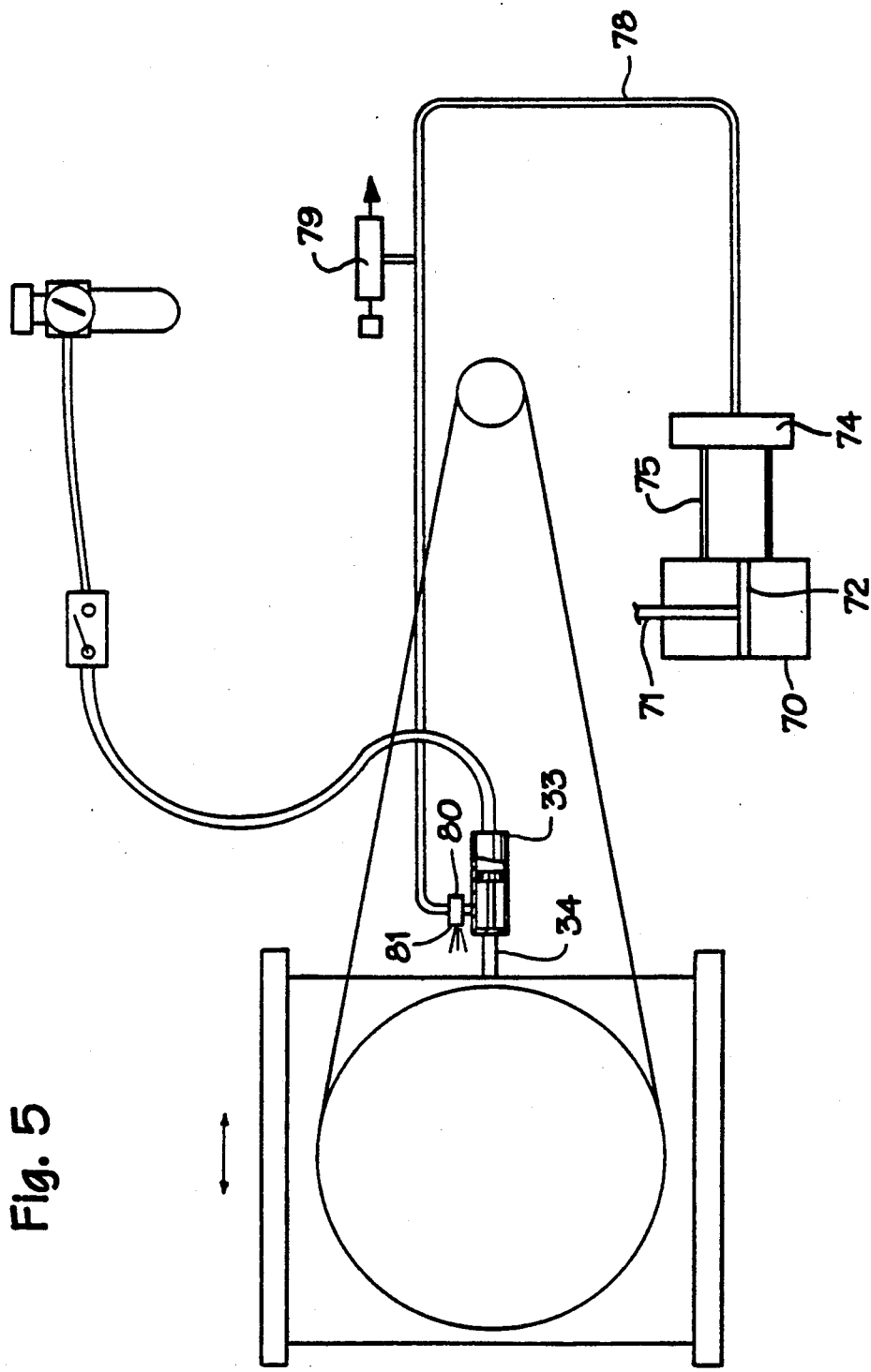
FIG. 5 is a pneumatic circuit diagram, including the tension reducing apparatus of the tension control apparatus shown in FIGS. 1 and 2.

Pressure is controlled by a pneumatic circuit illustrated in FIG. 5. Optimum tension on the belt 26 is determined empirically and is expressed in terms of "separation force" on the belt 26. As is shown in FIG. 5, pressurized air is supplied from an air compressor 35 to a pressure regulator 38. Assuming proper belt separation force is 120 psi and a 1.25 inch bore in cylinder 33, air at a pressure of 100 psi would be supplied from pressure regulator 38. An "on-off" switch 37 permits the tension control apparatus to be switched on and off as desired. As is apparent, any variables such as belt elongation are compensated for, since the piston rod 34 will extend or retract as required to exert the same separation force on belt 26.

Referring again to FIGS. 1 and 2, when in operation the bit 18 of the router 10 is moved upwardly into cutting position by depressing the foot pedal 24. The foot pedal 11 activates a piston and cylinder assembly 70. The piston rod 71 extends, raising the spindle 23 into cutting position. As described above, high tension conditions may cause the spindle 23 and therefore the bit 18 to hesitate slightly as upward movement begins. This is particularly true since the spindle must be lifted against the inertia of its own weight. This can cause the bit to jerk slightly or the workpiece to be pushed upwardly off of the surface of the table 17, thereby creating a slight defect in the workpiece.

A tension reducer which operates during movement of the spindle 23 from the lowered to the raised cutting position is shown schematically in FIG. 5. Piston and cylinder assembly 70 includes a piston rod 71 and a piston 72. The rod side and the blind side, respectively, are pneumatically connected to a power valve 74. Upward movement of the piston 72 as the spindle 23 is being raised delivers pressurized air to the power valve 74 from the rod side through a conduit 75. A conduit 76 communicates with the blind side of piston and cylinder assembly 70. Air from power valve 74 is conveyed through a conduit 78 to an adjustable needle valve 79 so that the pressure being delivered from the power valve 74 can be adjusted. A relatively open needle valve 79 will result in relatively little decrease in belt tension and relatively quick movement of spindle 23 into its raised cutting position. A relatively closed needle valve 79 will reduce the belt tension more and simultaneously reduce the speed of the spindle 23 as it is raised. While the tension reducer can operate during both raising and lowering of the spindle 23, lowering the spindle does not usually cause a problem, since the weight of the spindle itself aids in lowering it, and a quick downward movement of the spindle is not particularly undesirable since the bit 18 is being moved away from the workpiece.

Air of a predetermined suitable pressure is delivered from the needle valve 79 through conduit 78 downstream to a reservoir 80. Reservoir 80 has a small orifice 81 which bleeds to atmosphere, and therefore prevents pressure build-up and also provides a cushioning effect. Air passe from the reservoir 81 into the rod side of the piston and cylinder assembly 33 which exerts tension against the plate 32. Since pressure to tension the plate 32 is provided on the blind side of the piston and cylinder assembly 33, any air under pressure supplied to the rod side as the effect of reducing the net pressure applied to the plate 32.

For example, if it is assumed that 100 psi of separation force is applied to the belt 26, and 20 psi is supplied to the rod side of the piston and cylinder assembly 33, then the net pressure on plate 32 is reduced to 80 psi. Of course, this is merely an example, but any given pressure desired for providing proper tension on the spindle 23 while cutting can be reduced by a predetermined amount, as described above, by bleeding air from the piston and cylinder assembly 70.

Figure 3:
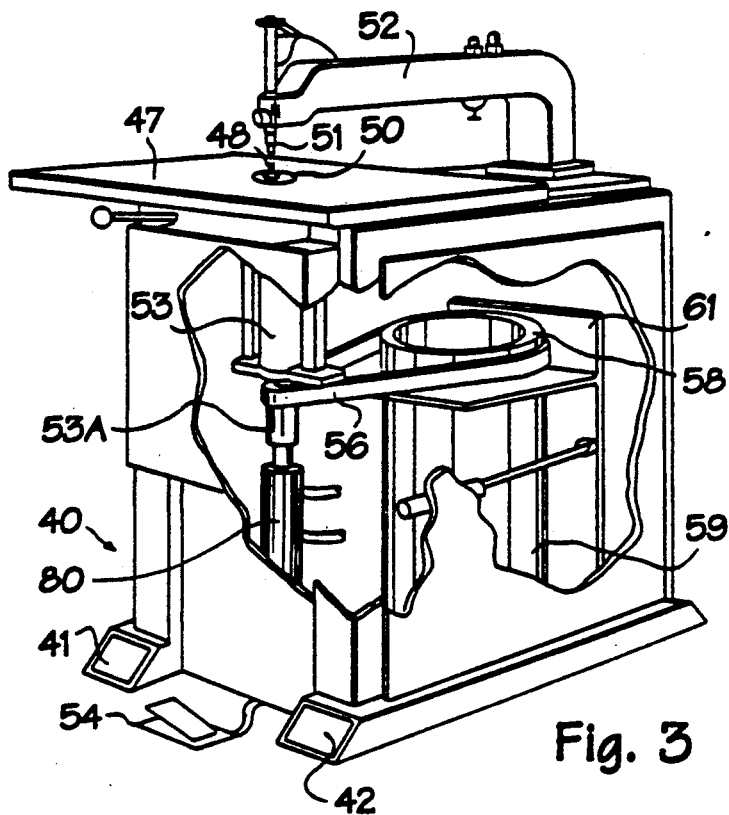
FIG. 3 is a perspective view of an inverted router, with parts broken away, according to a second embodiment of the invention.
Figure 4:
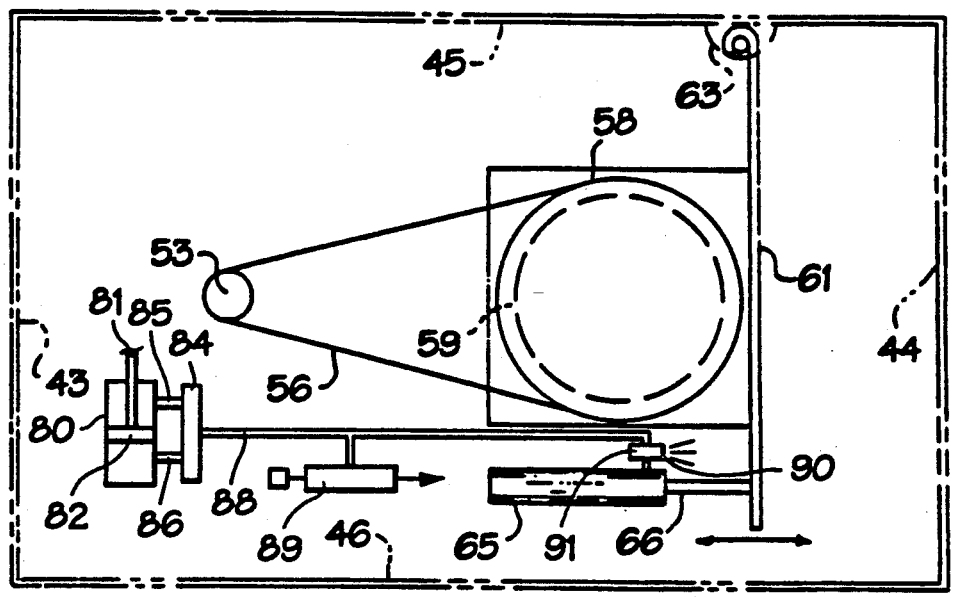
FIG. 4 is a fragmentary top plan view of the major drive components of the inverted router shown in FIG. 3.

Another embodiment of the tension control apparatus is shown in FIGS. 3 and 4. Router 40 is constructed on a steel frame which includes a pair of support skids 41 and 42 as with router 10. As is shown by simultaneous reference to FIGS. 3 and 4, the operating components of router 40 are housed within front and rear vertical wall panels 43 and 44, and side panels 45 and 46. A workpiece (not shown) is supported on a table 47 as it moved over a router bit 48 which extends upwardly through an opening 50 in table 47. A guide pin 51 positioned on the end of a guide arm 52 is used with a template to guide the workpiece.

Router bit 48 is mounted on the upper end of a spindle 53 by means of a chuck (not shown). Spindle 53 and therefore the router bit 48 is moved up and down by a foot pedal 54. Spindle 53 includes an elongate downwardly extending spindle pulley 53A which carries a woven drive belt 56. In contrast to router 10 shown in FIGS. 1 and 2, belt 56 remains in a vertically stationary position on a motor pulley 58 as spindle 53 is moved up and down. Instead, spindle pulley 53A itself moves up and down causing relative movement between pulley 53A and belt 56. Belt 56 is therefore remains trained in relation to motor pulley 58.

The foot pedal 54 activates a piston and cylinder assembly 80 and the spindle 53 is raised into cutting position.

A tension reducer which operates during movement of the spindle 53 from the lowered to the raised cutting position is also shown in FIG. 4. Piston and cylinder assembly 80 includes a piston rod 81 and a piston 82. The rod side and the blind side, respectively, are pneumatically connected to a power valve 84. Upward movement of the piston 82 as the spindle 53 is being raised delivers pressurized air to the power valve 84 from the rod side through a conduit 85. A conduit 86 communicates with the blind side of piston and cylinder assembly 80. Air from power valve 84 is conveyed through a conduit 88 to an adjustable needle valve 89 so that the pressure being delivered from the power valve 84 can be adjusted. A relatively open needle valve 89 will result in relatively little decrease in belt tension and relatively quick movement of spindle 53 into its raised cutting position. A relatively closed needle valve 89 will reduce the belt tension more and simultaneously reduce the speed of the spindle 53 as it is raised. While the tension reducer can operate during both raising and lowering of the spindle 53, lowering the spindle does not usually cause a problem, since the weight of the spindle itself aids in lowering it, and a quick downward movement of the spindle is not particularly undesirable since the bit 18 is being moved away from the workpiece.

Air of a predetermined suitable pressure is delivered from the needle valve 89 through conduit 88 downstream to a reservoir 90. Reservoir 90 has a small orifice 91 which bleeds to atmosphere, and therefore prevents pressure build-up and also provides a cushioning effect. Air passes from the reservoir 91 into the rod side of the piston and cylinder assembly 53 which exerts tension against the plate 61. Since pressure to tension the plate 61 is provided on the blind side of the piston and cylinder assembly 65, any air under pressure supplied to the rod side as the effect of reducing the net pressure applied to the plate 61.

Motor pulley 58 is mounted for rotation on a drive motor 59. Drive motor 59 is mounted by its feet onto a vertically positioned steel plate 61. Steel plate 61 is pivotally mounted by means of vertically spaced hinges 63 on side wall 45 of router 40. A pneumatic cylinder 65 is mounted in fixed relation within router 40 in front of the side of plate 61 remote from hinges 63. A piston rod 66 is responsive to pneumatic pressure to urge plate 61 in the direction away from spindle 53.

In a preferred embodiment, a separation force of 100 psi can be reduced to 80 psi during movement of the spindle to its raised position by bleeding air from the rod side of the piston and cylinder assembly through a 1/16 inch conduit past suitably adjusted needle valve and into the reservoir having a small orifice to atmosphere. The diameter of the orifice may be on the order of 0.009–0.010 inches.

As noted above, the invention has application to any type of powered machine which utilizes pneumatic pressure to control tension between driving and driven elements during axial movement of one of the elements.

A tension reducer for tension control apparatus is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. In an inverted router characterized by having a drive motor, a motor driven pulley, a router bit-carrying spindle moveable between a lowered inoperative position and an raised cutting position, a drive belt for transferring rotational motion from the motor driven pulley to said spindle, and a drive belt tension control apparatus, said drive belt tension control apparatus including mounting means for mounting said motor driven pulley in continuously variable spaced-apart relation to said spindle during operation of the router and pressure means for exerting a predetermined pressure on said motor driven pulley and thereby a predetermined tension on said drive belt during operation of the router for rotating the spindle;

the improvement which comprises tension reducing means for reducing the tension on the spindle during movement of the spindle between its lowered inoperative position and raised cutting positions for preventing tension-induced hesitation in the movement of the spindle.

2. In an inverted router according to claim 1, wherein said pressure means comprises a first pneumatic cylinder and piston assembly.

3. In an inverted router according to claim 2, and including a second pneumatic piston and cylinder means mounted in axial alignment with the axis of movement of the spindle for moving the spindle; said tension reducing means comprising valve means for bleeding air from said second pneumatic piston and cylinder means during movement of the spindle from its lower to its raised position, and conduit means for conveying the bleed air from the second pneumatic piston and cylinder means to said first pneumatic piston and cylinder means in opposition to the air pressure in the first piston and cylinder means to thereby reduce the air pressure therein and the tension applied by the motor driven pulley through the drive belt to the spindle during spindle movement.

4. In an inverted router according to claim 3, wherein said conduit means includes air reservoir means with an opening to atmosphere for reducing air pressure within said conduit.

5. In an inverted router according to claim 3, wherein said conduit means communicates with the rod-side of the first piston and cylinder assembly.

6. In an inverted router according to claim 1, wherein said drive motor and said spindle are each vertically positioned in axial alignment with each other, and wherein said mounting means comprises a plate pivotally mounted to one side wall of said router.

7. In an inverted router according to claim 1, wherein said mounting means comprise a plate mounted for sliding movement perpendicular to the axis of rotation of said spindle.

8. In an inverted router according to claim 7, wherein said mounting means includes a pair of spaced-apart, opposed slide rails positioned on opposing vertical side walls of said router, and said plate positioned for sliding movement in said slide rails.

9. In an inverted router according to claim 8, wherein said pressure means comprises a pneumatic pressure cylinder and piston assembly, with one of the cylinder or the piston mounted on a stationary portion of the router and the other of the cylinder and piston engaging said plate.

10. In a power tool characterized by having a drive motor, a motor driven pulley, a spindle, a drive belt for transferring rotational motion from the motor driven pulley to said spindle, and a drive belt tension control apparatus, said drive belt tension control apparatus including mounting means for mounting said motor driven pulley in continuously variable spaced-apart relation to said spindle during operation of the power tool and pressure means for exerting a predetermined pressure on said motor driven pulley and thereby a predetermined tension on said drive belt during operation of the power tool for rotating the spindle;

the improvement which comprises tension reducing means for reducing the tension on the spindle during application of axial movement to the spindle for preventing tension-induced hesitation in the axial movement of the spindle due to excess tension on the spindle.

11. In a power tool according to claim 10, wherein said pressure means comprises a first pneumatic cylinder and piston assembly.

12. In a power tool according to claim 11, and including a second pneumatic piston and cylinder means mounted in axial alignment with the axis of movement of the spindle for moving the spindle; said tension reducing means comprising valve means for bleeding air from said second pneumatic piston and cylinder means during movement of the spindle from its lower to its raised position, and conduit means for conveying the bleed air from the second pneumatic piston and cylinder means to said first pneumatic piston and cylinder means in opposition to the air pressure in the first piston and cylinder means to thereby reduce the air pressure therein and the tension applied by the motor driven pulley through the drive belt to the spindle during spindle movement.

13. In a power tool according to claim 12, wherein said conduit means includes air reservoir means with an opening to atmosphere for reducing air pressure within said conduit.

14. In a power tool according to claim 13, wherein said conduit means communicates with the rod-side of the first piston and cylinder assembly.

15. In a power tool according to claim 10, wherein said drive motor and said spindle are each vertically positioned in axial alignment with each other.

* * * * *